United States Patent
Furumiya et al.

(10) Patent No.: US 6,829,208 B1
(45) Date of Patent: Dec. 7, 2004

(54) OPTICAL DISK REPRODUCING METHOD AND REPRODUCING DEVICE

(75) Inventors: Shigeru Furumiya, Hyogo (JP); Ryutaro Futakuchi, Osaka (JP); Hiromichi Ishibashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 409 days.

(21) Appl. No.: 10/049,683

(22) PCT Filed: Aug. 4, 2000

(86) PCT No.: PCT/JP00/05275
§ 371 (c)(1),
(2), (4) Date: Feb. 15, 2002

(87) PCT Pub. No.: WO01/13366
PCT Pub. Date: Feb. 22, 2001

(30) Foreign Application Priority Data

Aug. 18, 1999 (JP) .......................... 11-231092

(51) Int. Cl.⁷ .............................................. G11B 7/005
(52) U.S. Cl. ............................... 369/59.19; 369/59.16; 369/124.13
(58) Field of Search .......................... 369/47.17, 53.33, 369/59.19, 59.15, 59.16, 124.12, 124.13, 59.1

(56) References Cited

U.S. PATENT DOCUMENTS

| | | | |
|---|---|---|---|
| 4,628,497 A | * 12/1986 | Bierhoff | 369/44.32 |
| 5,014,257 A | * 5/1991 | Tanahashi et al. | 369/59.15 |
| 5,040,165 A | 8/1991 | Taii et al. | 369/275.4 |
| 5,377,178 A | * 12/1994 | Saito et al. | 369/124.07 |
| 5,596,559 A | * 1/1997 | Hiramatsu | 369/47.26 |
| 5,610,897 A | 3/1997 | Yamamoto et al. | 369/124 |
| 6,031,802 A | * 2/2000 | Park et al. | 369/53.33 |
| 6,034,936 A | * 3/2000 | Ogawa et al. | 369/53.28 |

FOREIGN PATENT DOCUMENTS

| | | | |
|---|---|---|---|
| EP | 0 555 049 A2 | 11/1993 | |
| JP | 07230623 A | * 8/1995 | G11B/7/00 |

OTHER PUBLICATIONS

International Search Report, Application No. PCT/JP00/05275, dated Dec. 12, 2000.

* cited by examiner

*Primary Examiner*—Hoa T. Nguyen
*Assistant Examiner*—Peter Vincent Agustin
(74) *Attorney, Agent, or Firm*—Renner, Otto, Boisselle & Sklar, LLP

(57) ABSTRACT

The reproduction method includes steps of: performing an addition operation on a detection signal obtained by the first light-detecting element group and a detection signal obtained by the second light-detecting element group so as to generate a summation signal and outputting the summation signal to a signal processing section; performing a difference operation on a detection signal obtained by the first light-detecting element group and a detection signal obtained by the second light-detecting element group so as to generate a differential signal and outputting the differential signal to the signal processing section; digitalizing the summation signal so as to generate a binary signal, and generating a binary signal edge pulse; when an amplitude which is equal to or greater than a predetermined value of the differential signal is detected, outputting the binary signal edge pulse as a reproduction edge pulse from the signal processing section; and generating the reproduction data.

6 Claims, 8 Drawing Sheets

OPTICAL DISK REPRODUCING METHOD AND REPRODUCING DEVICE

TECHNICAL FIELD

The present invention relates to a reproduction method of an optical disc and a reproduction apparatus.

BACKGROUND ART

A DVD (Digital Versatile Disc) is known as an optical disc which can store a large amount of digital information. For DVD, a technique for recording/reproducing data of 4.7 GB on one surface of a disc having a diameter of 12 cm using a red-color laser having a wavelength of about 650 nm has been put into practice. Pits formed on a recording surface of an optical disc each have a width of about 0.3 $\mu$m and a length of about 0.4 to 2.0 $\mu$m. Such a pit is read by using a laser beam spot having an intensity of full-width at half maximum of about 0.6 $\mu$m (see FIG. 3). In a DVD-ROM (Read Only Memory) disc, pits are formed in the shape of oval concavities/convexities. At a stepped portion of a pit, diffraction is caused by an emitted laser beam spot, and a variation in the amount of reflected light is caused due to the diffraction. By utilizing this variation, a reproduction signal is obtained.

On the other hand, the present inventors produced a sample disc on which pits smaller than the pits of the above DVD were formed. The present inventors have been developing a next generation optical disc system where reproduction is performed on such a disc having smaller pits formed thereon, using a beam having a reduced beam spot size, so that higher density and larger capacity are achieved. For example, when a blue-color laser is used as a light source of an optical pick up, the beam spot size is about 0.4 $\mu$m, and accordingly, an area density which is two times equal to or higher than that of a conventional DVD can be expected.

Information reproduction on a conventional DVD and the above high-density optical disc under development is described with reference to FIG. 1. FIG. 1 is a schematic diagram showing pits recorded on an optical disc, a laser beam used for reproducing the pits, and a reproduction signal which is reproduced based on the intensity of reflected light. FIG. 1(a) is a drawing of a conventional DVD of low recording density, and FIG. 1(b) is a drawing of the high-density optical disc under consideration.

In the conventional DVD of low recording density, as shown in FIG. 1(a), a reproduction signal 52 is obtained by scanning a pit sequence 50 on the DVD with a red-color laser beam spot 51 for DVD. In this case, when not the entirety but only a portion of the beam spot area overlaps with a pit, the intensity of reflected light is decreased due to diffraction of light. In a reproduction signal 52 which is generated by detecting such a decrease in the intensity of reflected light, the amplitude has a shape that corresponds to the pits 50 and mirror portions 50a (where no pit is formed). In this DVD example, the physical sizes are assumed such that the pit width 53 is about 0.3 $\mu$m, and the beam spot size (diameter) 54 is about 0.6 $\mu$m.

On the other hand, in the high-density optical disc where pits and a beam are relatively smaller, as shown in FIG. 1(b), a reproduction signal 57 is obtained by scanning a pit sequence 55 with a laser beam spot 56. In this case, when not the entirety but a portion of the beam spot area overlaps with a pit, the intensity of reflected light is decreased due to diffraction of light. In a reproduction signal 57 which is generated by detecting such a decrease in the intensity of reflected light, the amplitude has a shape that corresponds to the pits 55 and mirror portions 55a (where no pit is formed). In this high-density optical disc example, the physical sizes are assumed such that the pit width 58 is about 0.2 $\mu$m, and the beam spot size (diameter) 59 is about 0.4 $\mu$m. Therefore, in comparison with the conventional DVD, a density higher by a factor of 1.5 is achieved in one-dimensional, i.e., an area density is higher by a factor of 2.25.

The present inventors have been paying attention to a compatibility function with lower-grade mediums, with which a DVD having a conventional density can be reproduced by the above-described next generation high-density optical disc system. We discovered that, when a conventional optical disc is reproduced with an optical pickup with a smaller laser beam spot size, a problem which will be described below is caused because of the relationship in size between a laser beam spot for reproduction and a pit recorded on the disc. This problem is described below with reference to FIG. 2.

FIG. 2 is a schematic diagram showing a number of pits, a laser beam, and a reproduction signal obtained in the case where a conventional low recording density optical disc is reproduced by using a high recording density optical disc system. As shown in FIG. 2, a reproduction signal 62 is obtained by scanning a pit sequence 60, which has been recorded at a conventional recording density, with a laser beam spot 61 for high density information. When the beam spot 61, which has a small diameter, scans a central portion of the pits 60 having a large width w, almost the entire beam spot is included in each pit. In this case, diffraction of light is sufficiently small, and accordingly, the intensity of reflected light is not largely decreased. In the reproduction signal 62, mirror portions 60a (where no pit is formed) are accurately detected, but local peaks 63 in waveforms are detected in the central portions of elongated pits where a weak response (dotted line 65 in FIG. 2) should be obtained because of a reduced intensity of reflected light. When the reproduction signal 62 is converted with a slice level 64 into a binary signal 66, a pseudo pulse 67 is generated in the binary signal 66. The pseudo pulse 67 results in a critical error during reproduction.

In order to prevent generation of such a pseudo pulse, in one method, the beam spot size is increased by decreasing the numerical aperture of an objective lens of an optical pickup or by employing a plurality of lasers which operate at large wavelengths. However, such a method disadvantageously causes complexity of an optical pickup and an increase in cost.

The present invention was conceived in view of the above circumstances. An objective of the present invention is to provide a reproduction method of an optical disc and a reproduction apparatus by which information can be read out without causing an error from an optical disc, on which information has been recorded at a relatively low density, by using a laser having a small beam spot, which is usually used for reproducing a high recording density optical disc.

DISCLOSURE OF THE INVENTION

A reproduction method of an optical disc according to the present invention includes: a step of scanning a pit sequence recorded on the optical disc with a laser beam and detecting an intensity of reflected light from the optical disc by detectors formed by a plurality of light-detecting elements so as to generate detection signals; and a step of generating reproduction data based on the detection signals, wherein the detectors are grouped into a first light-detecting element group and a second light-detecting element group with respect to a scanning direction of the laser beam, and the reproduction method includes steps of:

performing an addition operation on a detection signal obtained by the first light-detecting element group and a detection signal obtained by the second light-detecting element group so as to generate a summation signal and outputting the summation signal to a signal processing section;

performing a difference operation on a detection signal obtained by the first light-detecting element group and a detection signal obtained by the second light-detecting element group so as to generate a differential signal and outputting the differential signal to the signal processing section;

digitalizing the summation signal by the signal processing section so as to generate a binary signal, and generating a binary signal edge pulse which corresponds to a rising edge or a falling edge of the binary signal;

only when an amplitude which is equal to or greater than a predetermined value of the differential signal is detected, outputting the binary signal edge pulse as a reproduction edge pulse which corresponds to an edge of the pit from the signal processing section; and generating the reproduction data based on the reproduction edge pulse, whereby the above objective is achieved.

Where a length of the pit along the scanning direction of the laser beam is longer than a width of the pit along a direction perpendicular to the scanning direction, the width is represented by w, and the intensity of full-width at half maximum of the laser beam spot is represented by h, when $2w \leq h$, the binary signal edge pulse is output as it is, from the signal processing section, as the reproduction edge pulse; and when $2w > h$, only in the case where an amplitude which is equal to or greater than the predetermined value of the differential signal is detected, the binary signal edge pulse is output from the signal processing section as the reproduction edge pulse.

In one embodiment, the reproduction method of an optical disc further includes a step of determining that the optical disc is a disc for high recording density or a disc for low recording density, wherein:

when it is determined that the optical disc is a disc for high recording density, the binary signal edge pulse is output as it is, from the signal processing section, as the reproduction edge pulse; and when it is determined that the optical disc is a disc for low recording density, only in the case where an amplitude which is equal to or greater than the predetermined value of the differential signal is detected, the binary signal edge pulse is output from the signal processing section as the reproduction edge pulse.

A reproduction apparatus for an optical disc according to present invention includes an optical pickup including detectors formed by a plurality of light-detecting elements for scanning a pit sequence recorded on the optical disc and detecting an intensity of reflected light from the optical disc so as to generate detection signals, wherein reproduction data is generated based on the detection signals of the detectors, the detectors are grouped into a first light-detecting element group and a second light-detecting element group with respect to a scanning direction of the laser beam, and the reproduction apparatus includes:

an adder for performing an addition operation on a detection signal obtained by the first light-detecting element group and a detection signal obtained by the second light-detecting element group so as to generate a summation signal;

a differential amplifier for performing a difference operation on a detection signal obtained by the first light-detecting element group and a detection signal obtained by the second light-detecting element group so as to generate a differential signal; and a signal processing section for generating a reproduction edge pulse which corresponds to an edge of the pit based on the summation signal and the differential signal, and the signal processing section includes:

a binarization circuit for digitalizing the summation signal so as t6 generate a binary signal;

an edge detector for generating a binary signal edge pulse which corresponds to a rising edge or a falling edge of the binary signal;

an amplitude detection circuit for outputting a gate signal which is high only when an amplitude which is equal to or greater than a predetermined value of the differential signal is detected;

a logical operation circuit for outputting the binary signal edge pulse as the reproduction edge pulse only when the high gate signal is input thereto; and a reproduction data generation section for generating the reproduction data based on the reproduction edge pulse, whereby the above objective is achieved.

In one embodiment, the reproduction apparatus for an optical disc further includes a switch for turning ON/OFF an electrical connection between the amplitude detection circuit and the logical operation circuit, wherein the reproduction apparatus is structured such that the switch is turned OFF when the optical disc is a disc for high recording density, and the switch is turned ON when the optical disc is a disc for low recording density.

In one embodiment, the reproduction apparatus for an optical disc further includes a first equalizer for correcting a frequency characteristic of the summation signal and a second equalizer for correcting a frequency characteristic of the differential signal.

BEST MODE FOR CARRYING OUT THE INVENTION (Embodiment 1)

Figure 3:
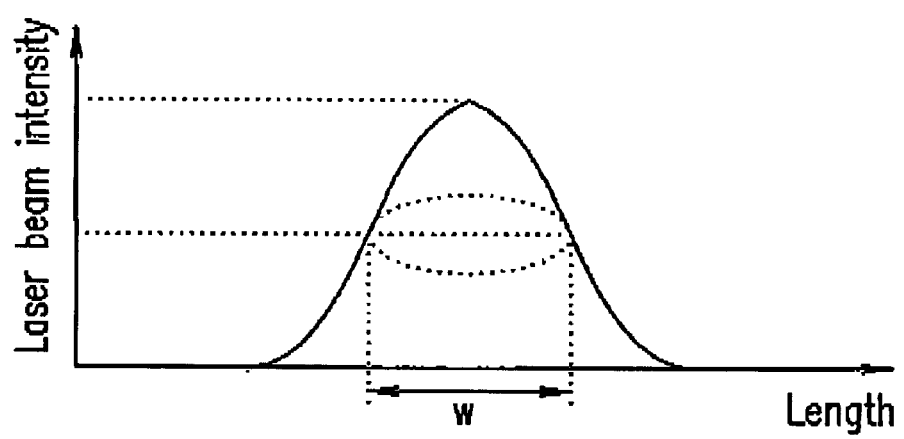
FIG. 3 shows a profile of the intensity of a laser beam spot.

Hereinafter, an optical disc reproduction apparatus and a reproduction method used therein according to embodiment 1 of the present invention are described with reference to the drawings. In this embodiment, the intensity of full-width at half maximum of an optical beam spot of a reproduction laser is substantially the same as the width of a pit recorded on an optical disc. That is, in this embodiment, an optical disc having a relatively low recording density is reproduced using an apparatus incorporating an optical pickup that is to be used for reproduction on a high recording density optical disc. The term, "intensity of full-width at half maximum (w)" of an optical beam spot of a laser, refers to a beam diameter which corresponds to a ½ of the maximum value of the intensity of a laser beam, as shown in FIG. 3 which shows an intensity profile of an optical beam spot of the laser.

Figure 1:
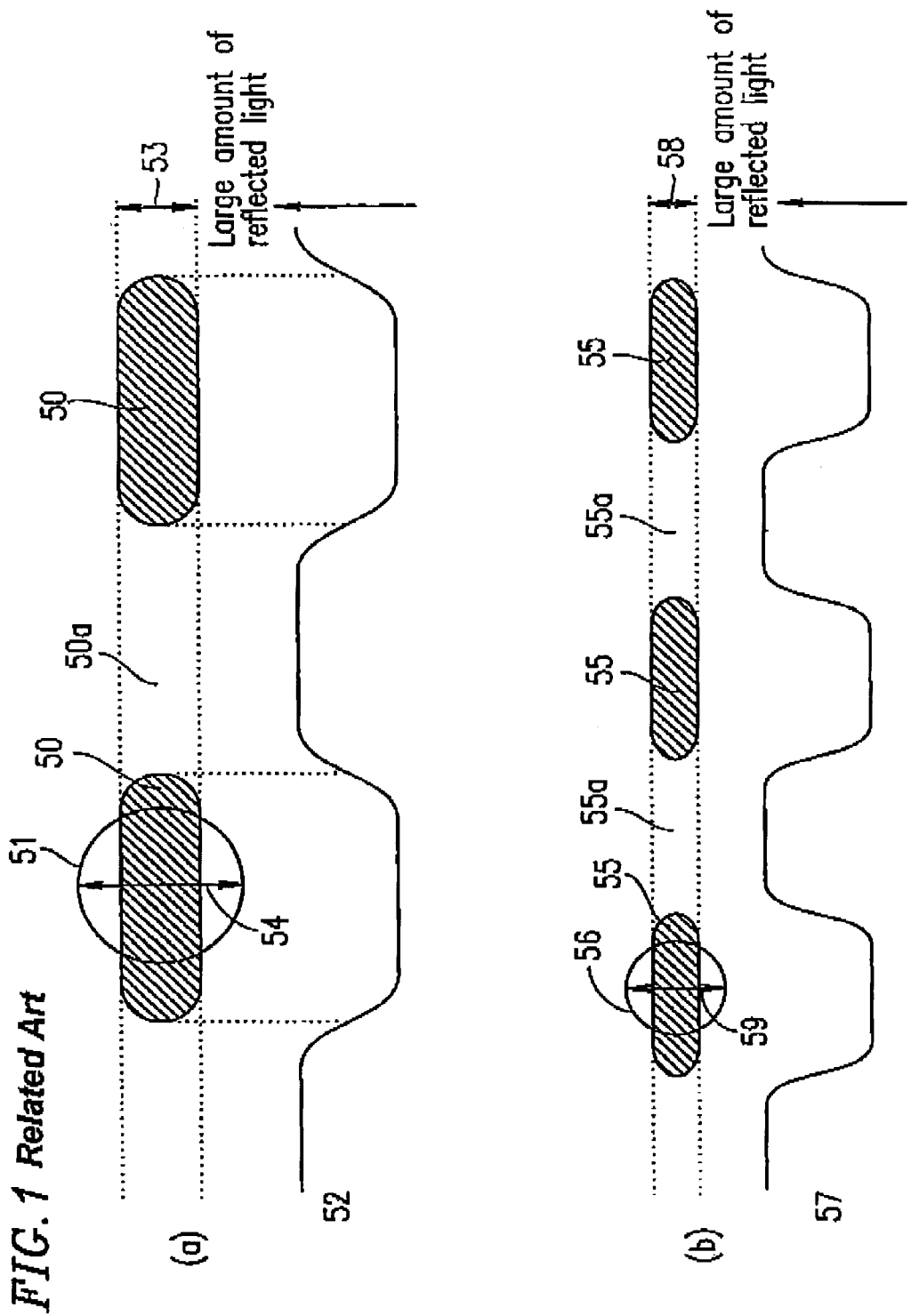
FIG. 1(a) is a schematic diagram showing pits, a laser beam, and a reproduction signal for a DVD of low recording density.
FIG. 1(b) is a schematic diagram showing pits, a laser beam, and a reproduction signal for an optical disc of high recording density.
Figure 2:
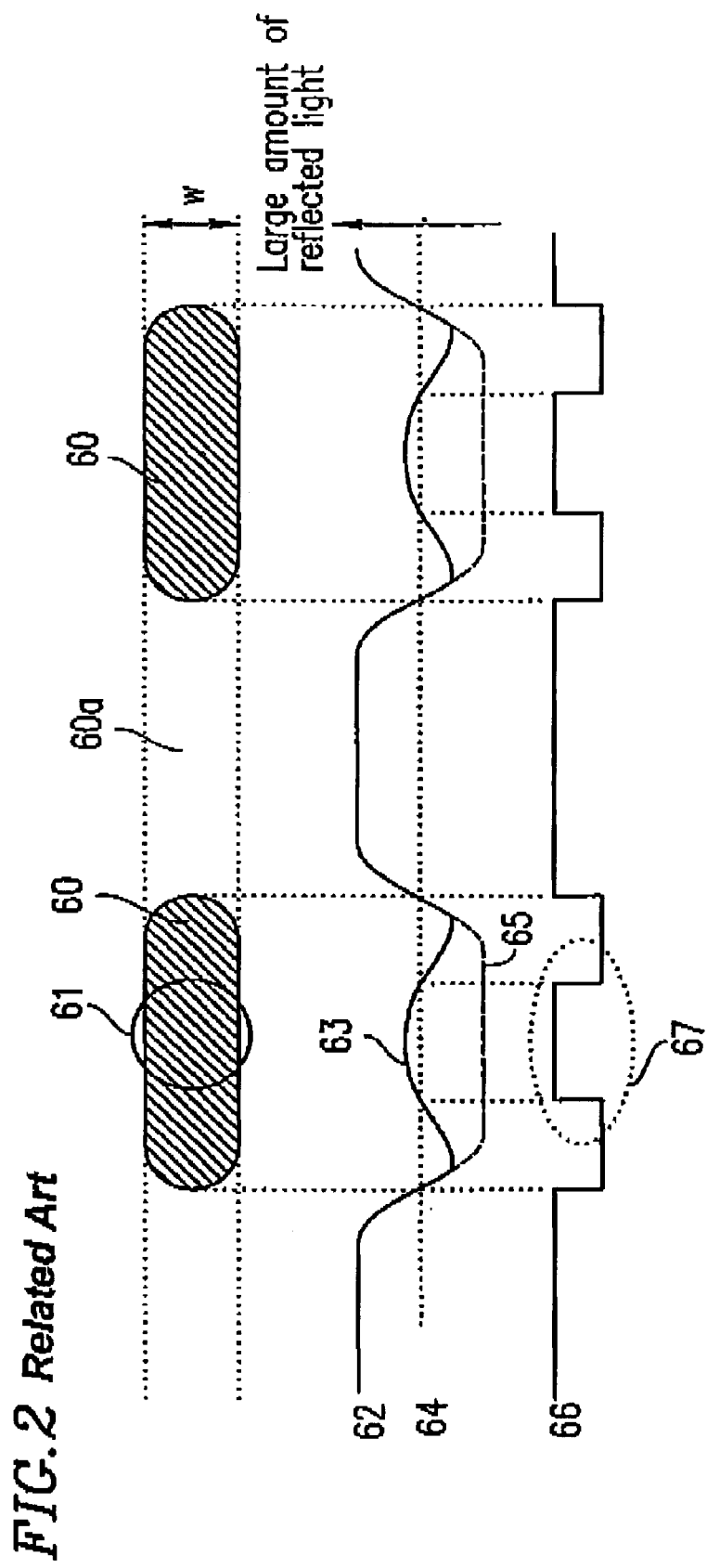
FIG. 2 is a schematic diagram showing pits, a laser beam, and a reproduction signal obtained in the case where information on a low recording density DVD is reproduced by using a laser beam having a small diameter.
Figure 4:
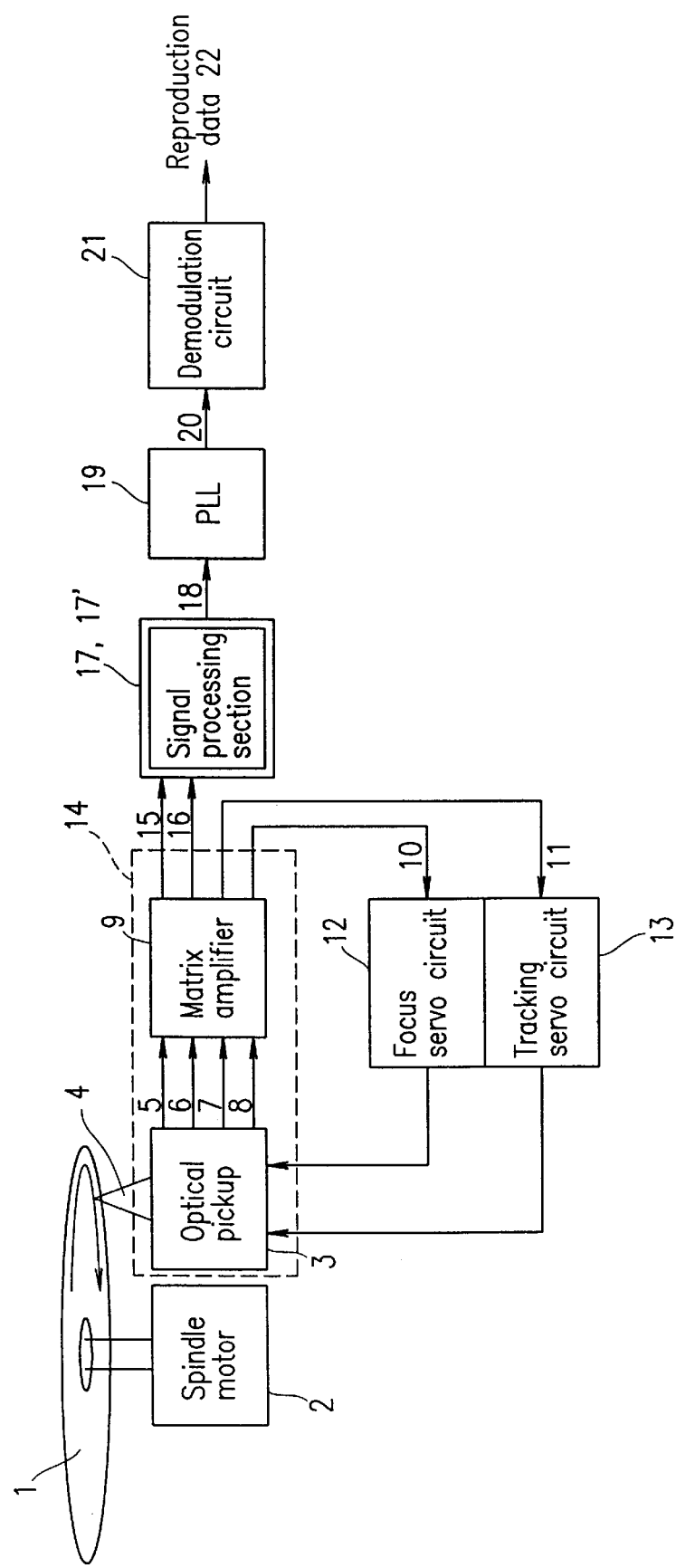
FIG. 4 shows the entire structure of an optical disc reproduction apparatus according to the present invention.

FIG. 4 shows the entire structure of an optical disc reproduction apparatus according to this embodiment. An optical disc 1 has signal pits formed thereon at a low density along the circumferential direction in the form of a spiral (see FIG. 1(a) for its microscopic arrangement). The optical disc 1 is rotated by a spindle motor 2. The signal pits on the optical disc 1 are reproduced by irradiating the pits with a laser beam spot 4 having a small diameter from a laser (not shown) provided in an optical pickup 3 for high recording density.

The optical pickup 3 allows the laser beam spot 4 to scan a signal pit sequence on the rotating optical disc 1 and detects reflected light from the optical disc 1 so as to output detection signals 5–8. The detection signals 5–8 are input in a matrix amplifier 9. The optical pickup 3 and the matrix amplifier 9 generate a focus error signal 10, a tracking error signal 11, a full-addition reproduction signal (summation signal) 15, and a differential signal of tangential direction 16.

Figure 5:
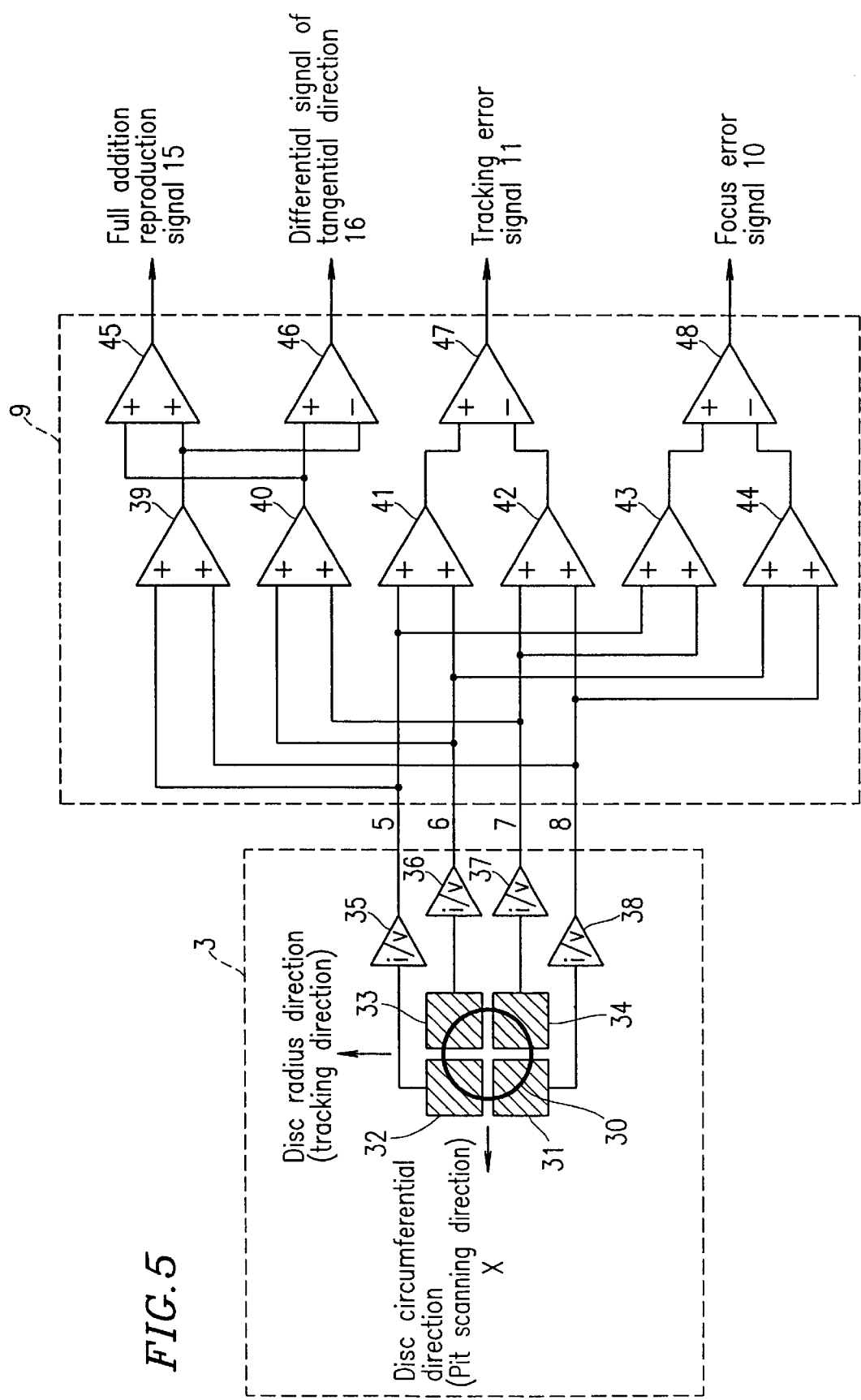
FIG. 5 shows details of an optical pickup and a matrix amplifier included in the optical disc reproduction apparatus.

The optical pickup 3 and the matrix amplifier 9 forms a signal detection section 14 of an optical disc reproduction apparatus according to this embodiment. Details of the signal detection section 14 are described with reference to FIG. 5. In the optical pickup 3, as shown in FIG. 5, reflected light from a laser beam spot incident on a pit of the optical disc 1 is focused as a received beam spot 30 on the centers of four detectors 31–34 which are arranged in a matrix and which perform photoelectric conversion. An electric current output from each detector is converted to a voltage through current/voltage conversion amplifiers 35–38, thereby generating detection signals 5–8.

The four detectors 31–34 are grouped into a first light-detecting element group (detectors 31 and 32) and a second light-detecting element group (detectors 33 and 34) with respect to the circumferential direction of the optical disc (scanning direction of the laser beam) X. The differential signal of tangential direction 16, which will be described later in detail, is a differential signal obtained between the detection signals from these two light-detecting element groups. The four detection signals are input to the matrix amplifier 9, and subjected to arithmetic processing of seven adders 39–45 and three differential amplifiers 46–48. A full-addition reproduction signal 15 is obtained by summing all of the detection signals detected by the four detectors.

That is, the full-addition reproduction signal 15 is expressed as the following expression:

(Full-addition-reproduction signal 15)=(detection signal 5)+(detection signal 6)+(detection signal 7)+(detection signal 8).

The differential signal of tangential direction 16 is a differential signal obtained from the detection signals of the first light-detecting element group (detectors 31 and 32) and the second light-detecting element group (detectors 33 and 34), which are grouped with respect to the circumferential direction of the disc (pit scanning direction) X. This is expressed as the following expression:

(Difference signal of tangential direction 16)={(detection signal 6)+(detection signal 7)}−{(detection signal 5)+(detection signal 8)}.

The tracking error signal 11 is a differential signal obtained from the detection signals of the detectors, which are grouped with respect to the radius direction of the disc (tracking direction). This is expressed as the following expression:

(Tracking error signal 11)={(detection signal 5)+(detection signal 6)}−{(detection signal 7)+(detection signal 8)}.

The above expression corresponds to a tracking method called a push-pull method.

The focus error signal 10 is a differential signal obtained from a difference between a sum of detection signals generated by diagonally-adjacent detectors and a sum of detection signals generated by the other diagonally-adjacent detectors. This is expressed as the following expression:

(Focus error signal 10)={(detection signal 5)+(detection signal 7)}−{(detection signal 6)+(detection signal 8)}.

The above expression corresponds to a focus method called an astigmatism method.

Referring again to FIG. 4, the focus error signal 10 is processed in a focus servo circuit 12. The tracking error signal 11 is processed in a tracking servo circuit 13. Based on these signals, an objective lens actuator (not shown) of an optical pickup 3 is driven so as to perform focus control and tracking control such that the laser beam spot 4 is moved to a target position in the pit sequence on the optical disc 1. The full-addition reproduction signal 15 and the differential signal of tangential direction 16 are input to a signal processing section 17 so as to generate a reproduction edge pulse 18 which is used for generating reproduction data.

Figure 6:
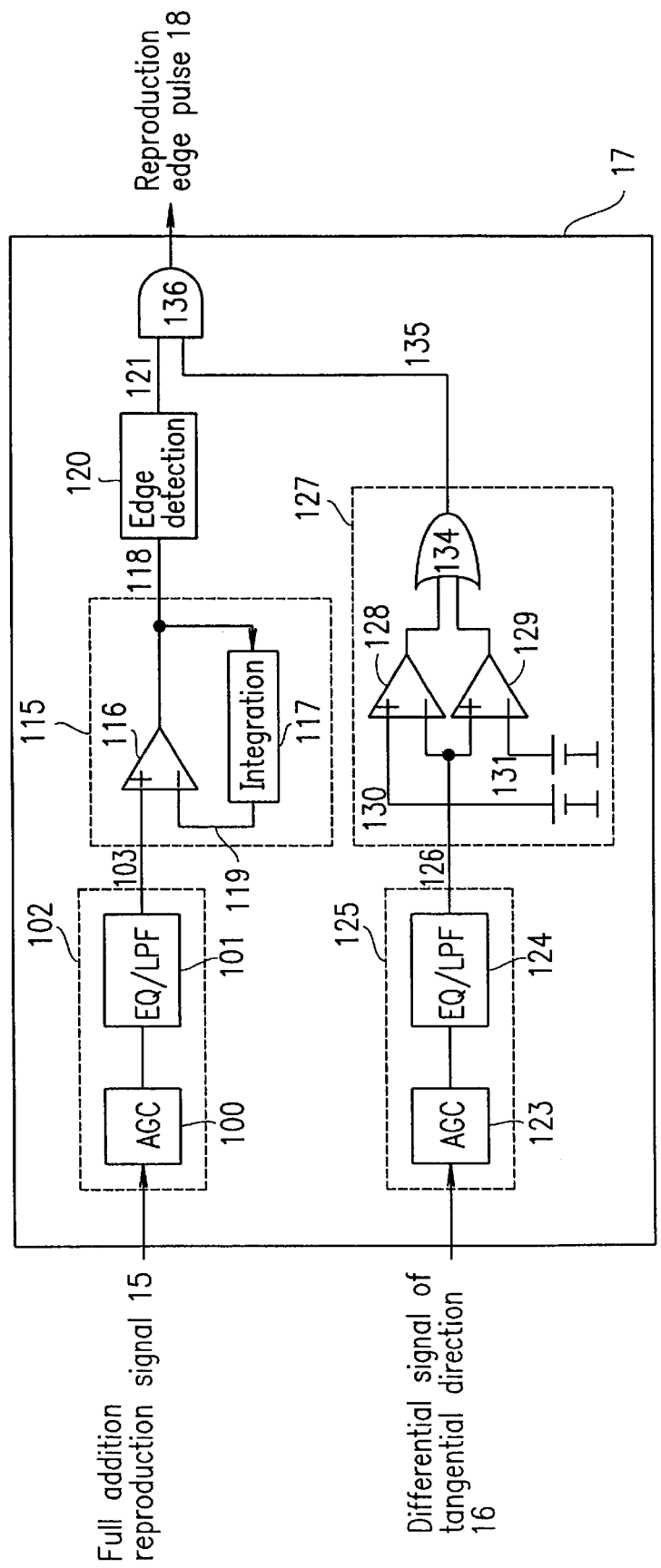
FIG. 6 shows details of a signal processing section according to embodiment 1 of the present invention.
Figure 7:
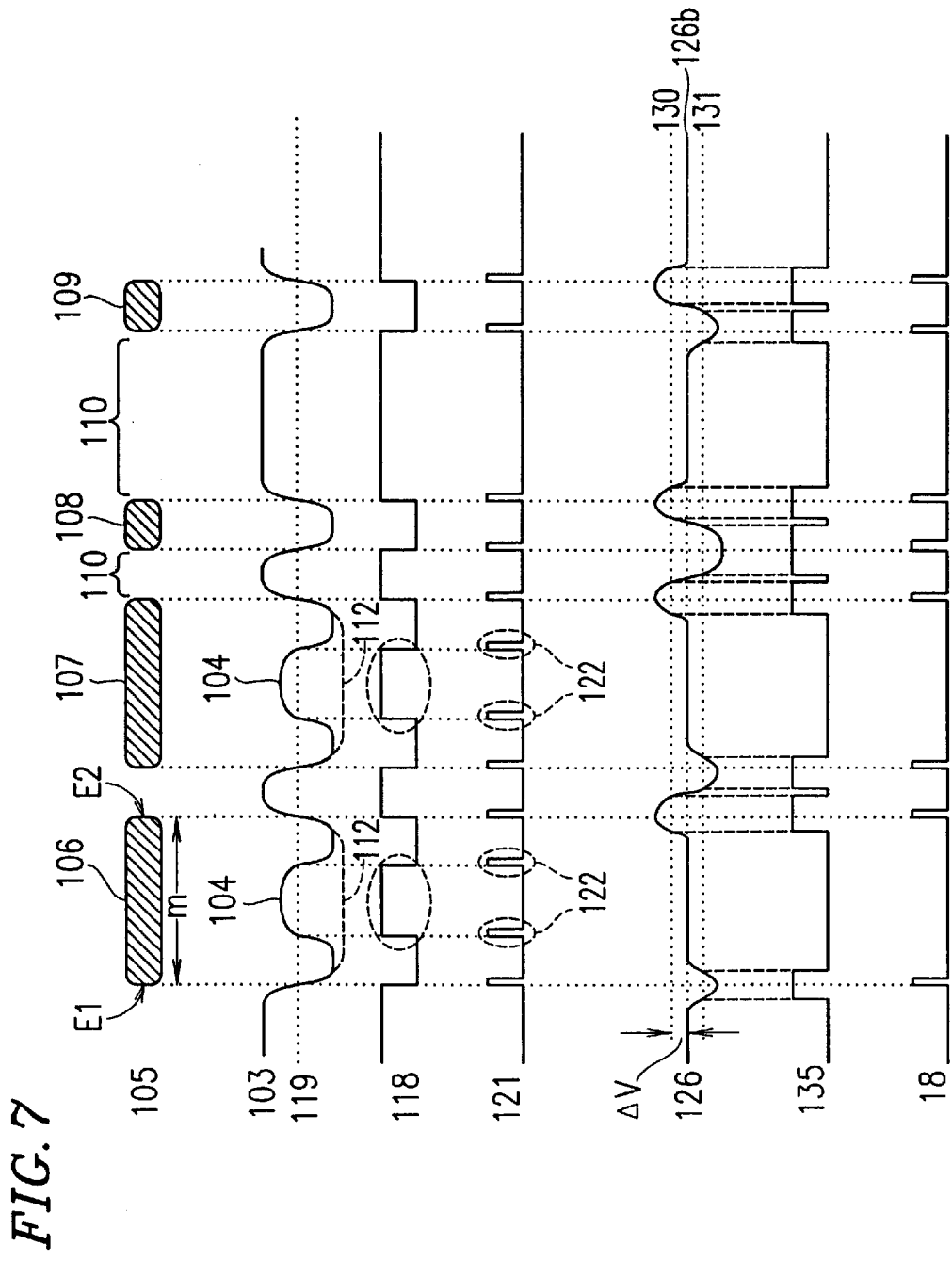
FIG. 7 is a signal waveform chart illustrating an operation of the signal processing section.

The signal processing section 17 is described in detail. FIG. 6 shows a structure of the signal processing section 17 of an optical disc reproduction apparatus according to this embodiment. FIG. 7 shows waveforms of a signal input to the signal processing section 17, a signal generated in the signal processing section 17, and a signal output from the signal processing section 17.

As shown in FIG. 6, the full-addition reproduction signal 15 input from the signal detection section 14 is subjected to waveform equalization processing performed by a pretreatment section (first equalizer) 102, which is formed by an AGC 100 for adjusting a signal amplitude and an EQ/LPF 101 for correcting a frequency characteristic. A waveform-equalized, full-addition reproduction signal 103 is shown in FIG. 7. In the waveform-equalized, full-addition reproduction signal 103, portions corresponding to central portions of large pits 106 and 107 having a length m do not result in an expected response (broken lines 112) but result in a response having a local peak 104. In portions corresponding to a mirror portion 110 (where no pit is formed) and short pits 108 and 109, a local peak is not generated.

The waveform-equalized, full-addition reproduction signal 103 is input to a binarization circuit 115 as shown in FIG. 6. The binarization circuit 115 is formed by a comparator 116 and an integrator 117. The binarization circuit 115 performs analog-digital conversion while performing feedback control of a slice level 119 such that an integration value of a binarized pulse is always kept constant, whereby a binary signal 118 is generated. This binarization method is called a duty feedback method. Further, the binary signal 118 is input to an edge detector 120, which outputs an edge pulse 121 corresponding to positions of rising edges and falling edges of the binary signal 118. FIG. 7 shows a waveform relationship between the binary signal 118 generated by digitalizing the full-addition reproduction signal 103 with respect to the slice level 119 and the edge pulse 121 generated based on the edges of the binary signal 118. In the edge pulse (binary signal edge pulse) 121, pseudo edge pulses 122 are generated at positions corresponding to the local peaks 104 of the full-addition reproduction signal 103, at which pit edges should not be generated.

As shown in FIG. 6, the differential signal of tangential direction 16 input from the signal detection section 14 is subjected to waveform equalization processing performed by a pretreatment section (second equalizer) 125, which is formed by an AGC 123 for adjusting a signal amplitude and an EQ/LPF 124 for correcting a frequency characteristic. A waveform-equalized, differential signal of tangential direction 126 is shown in FIG. 7. In the differential signal of tangential direction 126, a downward response is generated at a front edge E1 of a pit, and an upward response is generated at a rear edge E2 of the pit. In the other portions, the differential signal of tangential direction 126 is at an intermediate level 126b. That is, the differential signal of tangential direction 126 has a characteristic such that amplitude responses are caused only at edges E1 and E2 of the pits, and no amplitude response is caused in portions where an edge of a pit does not exist.

As shown in FIG. 6, the differential signal of tangential direction 126 is input to an amplitude detection circuit 127 so as to generate a gate signal 135. The amplitude detection circuit 127 is formed by two comparators 128 and 129, a first reference voltage 130, a second reference voltage 131, and an OR gate 134. The differential signal of tangential direction 126 is binarized by using the first reference voltage 130 and the comparator 128 in order to detect high voltage portions of the differential signal of tangential direction 126. On the other hand, the differential signal of tangential direction 126 is binarized by using the second reference voltage 131 and the comparator 129 in order to detect low voltage portions of the differential signal of tangential direction 126. The two binarization results are subjected to logical sum processing by an OR gate 134, thereby generating a gate signal 135. That is, the amplitude detection circuit 127 sets the first reference voltage 130 as a first threshold value so as to be higher than the amplitude level of the differential signal of tangential direction 126 which is obtained when there is no pit edge (base level 126b), and sets the second reference voltage 131 as a second threshold value so as to be lower than the base level 126b. An absolute value ΔV of a level difference between the first reference voltage 130 or the second reference voltage 131 and the base level 126b is set, in consideration of noise in the amplitude level of the differential signal of tangential direction 126 which may be caused when there is no pit edge, such that this noise is not erroneously detected as a response signal corresponding to an edge of a pit (E1, E2). For example, the absolute value ΔV can be set so as to be about a half of the peak value of a response signal corresponding to an edge of a pit.

When an amplitude which is equal to or greater than the absolute value ΔV of the level difference between the first reference voltage 130 or the second reference voltage 131 and the base level 126b is detected in the differential signal of tangential direction 126, the gate signal 135 becomes high and is output from the amplitude detection circuit 127. When an amplitude which is smaller than the absolute value ΔV of the level difference is detected, the gate signal 135 becomes low and is output from the amplitude detection circuit 127. In FIG. 7, a synchronization relationship among a recorded pit sequence 105, the differential signal of tangential direction 126, the first reference voltage 130, the second reference voltage 131, and the gate signal 135 is shown by vertical dotted lines.

As shown in FIG. 6, the gate signal 135 and the binary signal edge pulse 121, which are generated as described above, are input to an AND gate 136. A reproduction edge pulse 18 shown in FIG. 7 is generated by the AND gate 136 and output from the signal processing section. When the gate signal 135 becomes high in the AND gate 136, the binary signal edge pulse 121 is output as the reproduction edge pulse 18. In other words, in this embodiment, only when an amplitude which is equal to or greater than a predetermined value of the differential signal of tangential direction 126 (the absolute value ΔV of the level difference) is detected, the binary signal edge pulse 121 is output as the reproduction edge pulse 18.

As shown in FIG. 7, the reproduction edge pulse 18 corresponds to the edges E1 and E2 of the pits. Based on the reproduction edge pulse 18, reproduction data (FIG. 4: described later) is generated. In this embodiment, control is performed based on the gate signal 135 such that the pseudo edge pulses 122 included in the edge pulse 121 are not included in the reproduction edge pulse 18 which is used for generating reproduction data output from the signal processing section 17. Thus, accurate reproduction of information can be achieved.

The pretreatment section 125 which has been described with reference to FIG. 6 and the above-described pretreatment section 102 also function so as to adjust the time delay between the full-addition reproduction signal and the differential signal of tangential direction, whereby the timing of the edge pulse 121 and the gate signal 135 are adjusted, such that the pseudo edges are completely removed from the reproduction edge pulse 18.

Next, a structure of the latter stage of the signal processing section 17 of the optical disc reproduction apparatus shown in FIG. 4 is briefly described. The reproduction edge pulse 18 detected in the signal processing section 17 is input to a PLL (phase-locked loop) circuit 19, and converted to a synchronization reproduction edge pulse 20. Lastly, the synchronization reproduction edge pulse 20 is input to a demodulation circuit 21, from which demodulated reproduction data 22 is output. In this specification, the PLL circuit 19 and the demodulation circuit 21 form a reproduction data generation section.

As described above, in an optical disc reproduction apparatus according to an embodiment of the present invention, when a wide pit recorded on a low density optical disc is reproduced by using a small laser beam spot which is designed for reproduction of information on a high density optical disc, a pseudo edge pulse included in a binary signal detected from the full-addition reproduction signal is not included in the reproduction edge pulse 18 thanks to control performed based on a gate signal detected from a differential signal of tangential direction. Thus, according to the present invention, even under a circumstance where sufficient diffraction cannot be obtained in a large size recording pit because almost all the portions of an optical beam spot is included in the recording pit, information can be read out without an error from a conventional, relatively low-density optical disc without increasing the beam diameter of a laser.

In this embodiment, the detector of the optical pickup includes four light-detecting elements (31–34), but the present invention is not limited to the number of the light-detecting elements. A signal obtained by adding some or all detection signals obtained from a plurality of light-detecting elements can be used as the full-addition reproduction signal described in this embodiment. Further, when detection signals are obtained from a plurality of light-detecting elements, a signal obtained from a difference in the detection signals between two light-detecting element groups which are grouped with respect to the circumferential direction of the optical disc (pit scanning direction of the beam) among detection signals obtained from a plurality of light-detecting elements can be used as the differential signal of tangential direction described in this embodiment.

Furthermore, the duty feedback method was used in the binarization circuit, but the present invention is not limited thereto. As a method of binarization, an AC feedback method where control is performed such that the amount of phase error in the PLL is reduced, or an envelope slice method where an envelope of a signal is detected in order to determine a binarization level, may be used. In some cases where the AC feedback method is used, a variation in the binary slice voltage which is caused due to an influence of a pseudo pulse can be suppressed. Furthermore, in the above-illustrated example, a comparator is used as a means for binarization. However, the same function may be achieved by using a multi-bit AD converter and a digital operation.

(Embodiment 2)

Next, an optical disc reproduction apparatus and a reproduction method according to embodiment 2 of the present invention are described.

This embodiment relates to an optical disc reproduction apparatus which reproduces both a regular optical disc having a high recording density and a conventional optical disc having a relatively low recording density by using an apparatus incorporating an optical pickup designed for reproducing a high recording density optical disc. In the high recording density optical disc, a pit recorded on the disc has a width of about 0.15 $\mu$m to 0.22 $\mu$m, and a length of about 0.15 $\mu$m to 0.9 $\mu$m. In the low recording density optical disc, a pit recorded on the disc has a width of about 0.25 $\mu$m to 0.35 $\mu$m, and a length of about 0.35 $\mu$m to 2 $\mu$m.

Differences between the optical disc reproduction apparatus according to this embodiment and that of embodiment 1 are in that an optical disc 1 in this embodiment may be any of two types of discs, a high recording density optical disc and a low recording density optical disc, and that the internal structures of the signal processing sections are different. In the following description, such differences are mainly described, but the other features are the same in the both embodiments and descriptions thereof are omitted.

In accordance with the experiments of the present inventors, a waveform of a local peak generated in a reproduction signal was small when 2w$\leq$h, where w denotes the width of a pit sequence on a disc, and h denotes the intensity of full-width at half maximum of a reproduction laser beam spot. Accordingly, a pseudo pulse was not generated by binarizing the reproduction signal as it was. This is because the width of the recorded pit was small with respect to the diameter of the reproduction beam spot, and thus, sufficient diffraction of light in the pit width direction was caused. On the other hand, when 2w>h, a large local peak was generated in the reproduction signal, and a pseudo pulse was generated in a pulse obtained by binarizing the reproduction signal. That is, an error was caused so long as such a pseudo pulse was not removed. This seems to be because the diameter of the reproduction beam spot and the width of the recorded pit are close in size, and sufficient diffraction in the pit width direction cannot be obtained in the central portion of an elongated pit. The former relationship, 2w$\leq$h, is satisfied when the high density optical disc having a small pit width is reproduced by using an optical pickup for high density reproduction which has a small beam diameter. The latter relationship, 2w>h, is satisfied when the low density optical disc having a large pit width is reproduced by using an optical pickup for high density reproduction which has a small beam diameter.

When a high density optical disc in which both the pit width and pit length are small is reproduced by using an optical pickup for high density reproduction which has a small beam diameter, the S/N ratio of a differential signal of tangential direction is decreased, and the reliability of a gate signal is low. When an operation for removing a pseudo pulse from an edge signal is continued by using such a gate signal of decreased reliability, an occurrence of a reproduction error can be increased on the contrary in some cases.

For the above reasons, in the high density optical disc reproduction apparatus, a function for removing a pseudo pulse which is performed by the signal processing section 17 (FIG. 6) is preferably ON/OFF-controlled according to the relationship between the width of a pit recorded on an optical disc to be reproduced and the diameter of a laser beam spot during reproduction (which is usually defined by the intensity of full-width at half maximum). That is, the high density optical disc reproduction apparatus is structured such that: when 2w$\leq$h (where w denotes the width of the pit sequence and h denotes the intensity of full-width at half maximum of the laser beam spot), the binary signal is used as it is as a reproduction signal; and when 2w>h, a reproduction signal is generated based on a signal obtained by removing a pseudo pulse from the binary signal by utilizing the amplitude of the differential signal.

Figure 8:
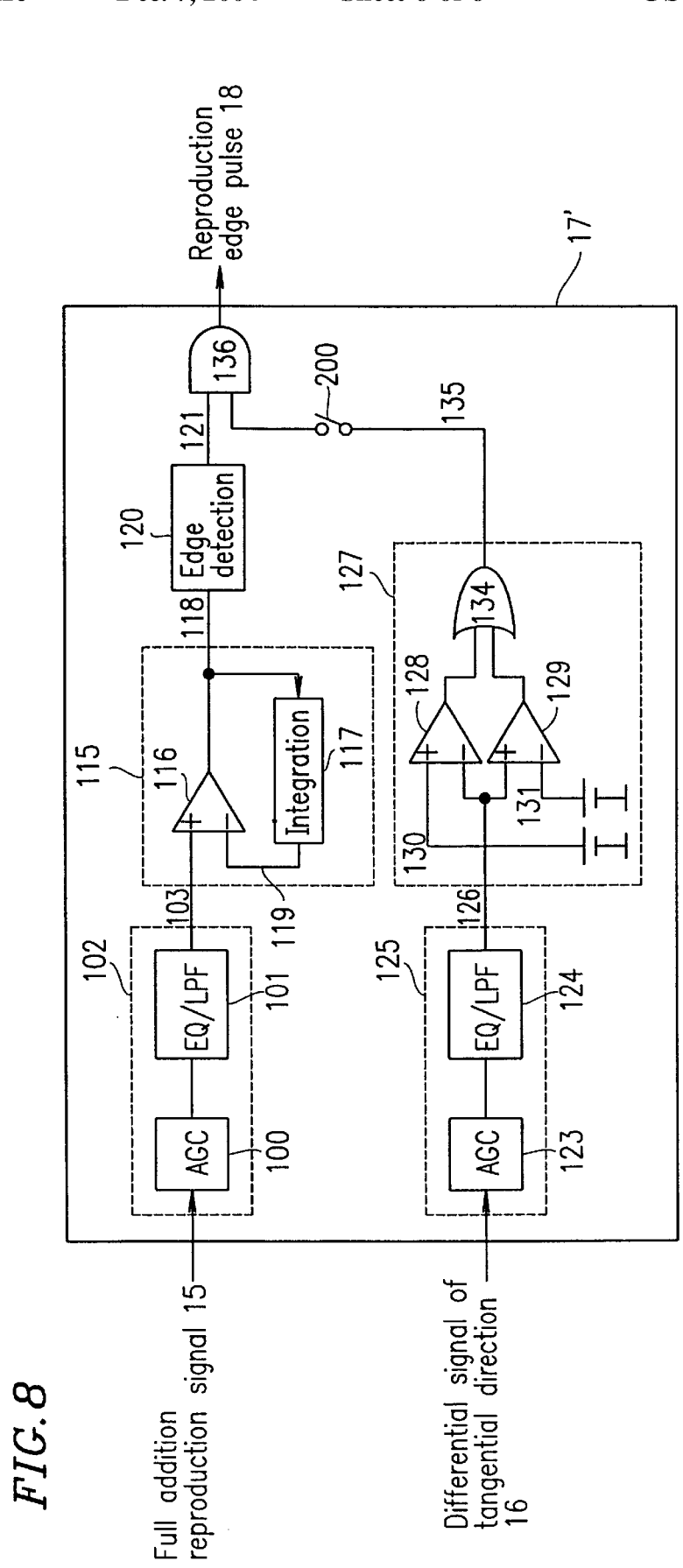
FIG. 8 shows details of a signal processing section according to embodiment 2 of the present invention.

The entire structure of the optical disc reproduction apparatus according to this embodiment is described with reference to FIG. 4, which was used in conjunction with embodiment 1. Herein, a case where the optical disc 1 is a high density optical disc in which the width of a recorded pit is small, and a case where the optical disc 1 is a low density optical disc in which the width of a recorded pit is large are described. FIG. 8 is a detailed illustration of a signal processing section 17' (FIG. 4). The signal processing section 17' is different from the signal processing section 17 of FIG. 6 in that the signal processing section 17' has a switch 200 for controlling whether or not the gate signal 135 is input to the AND gate 136.

In this embodiment, in the case of reproducing a high density optical disc, the switch 200 is turned OFF in consideration of a low reliability of the gate signal 135, because a pseudo edge pulse is not included in the edge pulse 121, as described above. In this case, the edge pulse 121 is output as it is as a reproduction edge pulse 18. On the other hand, in the case of reproducing a low density optical disc, the switch 200 is turned ON because a pseudo edge pulse is included in the edge pulse 121.

When the switch 200 is in the conduction state, a gate signal 135 which becomes high only at positions corresponding to edge portions E1 and E2 of pits (see FIG. 7) is output from the amplitude detection circuit 127 to the AND gate 136. By utilizing the gate signal 135, a pseudo edge pulse is removed from the edge pulse 121 by the AND gate 136, whereby a reproduction edge pulse 18 which does not include a pseudo edge pulse is generated.

It is preferable that the optical disc apparatus automatically determines the type of an optical disc mounted thereon (high recording density optical disc or low recording density optical disc), and the switch 200 is switched based on the determined type of the optical disc. As a method for determining the type of an optical disc, the following methods may be used: a method where an amplitude difference in a tracking error signal is detected; a method where a difference in the reflectance of a disc is detected; a method for determining the type of an optical disc by using an identification code recorded in a read-in area on an internal circumference of the disc; or a method where a test reading is performed both when the switch 200 is ON and when the switch 200 is OFF, and one of the states of the switch 200 which causes less errors is selected.

Next, a preferable, specific example of this embodiment is described with specific numeric numbers. An optical pickup incorporates a blue-color laser which operates at a wavelength of 400 nm, and the diameter of a laser beam spot is an intensity of full-width at half maximum of 0.45 $\mu$m. A high density optical disc was produced by cutting with an ultraviolet ray or electron beam, and pits formed thereon have a pit width of about 0.18 $\mu$m and a pit length of about 0.2 $\mu$m to 0.9 $\mu$m. The optical disc has a diameter of 12 cm, and in this case, has a capacity of about 15 GB. On the other hand, a DVD-ROM was used as a low density optical disc, which has a pit width of about 0.3 $\mu$m, a pit length of about 0.4 $\mu$m to 2 $\mu$m, and a capacity of about 4.7 GB. Where w denotes the width of a pit, and h denotes the diameter of the laser beam spot, the relationship $2w \leq h$ is satisfied in the high density optical disc, and the relationship $2w > h$ is satisfied in the DVD-ROM. When the high density optical disc was reproduced by the optical disc reproduction apparatus according to this embodiment, the reproduction was performed without causing an error while the switch 200 was OFF. On the other hand, when the DVD-ROM was reproduced while the switch 200 was OFF, a number of pseudo edge pulses were detected in the reproduction edge pulse 18. In this case, many errors were caused, and this arrangement was not practical. However, when the switch 200 was ON, a pseudo edge pulse was removed, and data was reproduced with sufficient quality.

As described above, in the optical disc reproduction apparatus according to this embodiment, information can be read from both the high density optical disc and low density optical disc only by changing the setting of circuitry without changing the diameter of the laser beam spot.

This embodiment has been described by using an example of a high density optical disc and a DVD, but the present invention is not limited thereto. For example, the concept of the present invention can be applied to a case where a CD (compact disc) having a density lower than that of a DVD is reproduced by using an optical pickup designed for a DVD, and in such a case, the same effects can be obtained.

INDUSTRIAL APPLICABILITY

According to a reproduction method and reproduction apparatus for an optical disc of the present invention, when a low recording density optical disc is reproduced using an optical pickup designed for high recording density, the magnitude of an amplitude of a differential signal (differential signal of tangential direction) which is generated by a difference operation of signals detected by detectors grouped with respect to the laser beam scanning direction, is detected, whereby a pseudo pulse which may be usually included in a binary signal can be electrically removed. Thus, reproduction of information can be performed on a plurality of types of optical discs having different recording densities by using the same reproduction apparatus. As a result, compatibility with a lower-grade optical disc can be realized with a minimum increase in the cost of the entire apparatus.

What is claimed is:

1. A reproduction method of an optical disc, comprising: a step of scanning a pit sequence recorded on the optical disc with a laser beam and detecting an intensity of reflected light from the optical disc by detectors formed by a plurality of light-detecting elements so as to generate detection signals; and a step of generating reproduction data based on the detection signals, wherein the detectors are grouped into a first light-detecting element group and a second light-detecting element group with respect to a scanning direction of the laser beam, and the reproduction method includes steps of:
performing an addition operation on a detection signal obtained by the first light-detecting element group and a detection signal obtained by the second light-detecting element group so as to generate a summation signal and outputting the summation signal to a signal processing section;
performing a difference operation on a detection signal obtained by the first light-detecting element group and a detection signal obtained by the second light-detecting element group so as to generate a differential signal and outputting the differential signal to the signal processing section;
digitalizing the summation signal by the signal processing section so as to generate a binary signal, and generating a binary signal edge pulse which corresponds to a rising edge or a falling edge of the binary signal;
only when an amplitude which is equal to or greater than a predetermined value of the differential signal is detected, outputting the binary signal edge pulse as a reproduction edge pulse which corresponds to an edge of the pit from the signal processing section; and
generating the reproduction data based on the reproduction edge pulse.

2. A reproduction method of an optical disc according to claim 1 wherein, where a length of the pit along the scanning direction of the laser beam is longer than a width of the pit along a direction perpendicular to the scanning direction, the width is represented by w, and the intensity of full-width at half maximum of the laser beam spot is represented by h, when $2w \leq h$, the binary signal edge pulse is output as it is, from the signal processing section, as the reproduction edge pulse; and when $2w > h$, only in the case where an amplitude which is equal to or greater than the predetermined value of the differential signal is detected, the binary signal edge pulse is output from the signal processing section as the reproduction edge pulse.

3. A reproduction method of an optical disc according to claim 1, further comprising a step of determining that the optical disc is a disc for high recording density or a disc for low recording density, wherein:

when it is determined that the optical disc is a disc for high recording density, the binary signal edge pulse is output as it is, from the signal processing section, as the reproduction edge pulse; and when it is determined that the optical disc is a disc for low recording density, only in the case where an amplitude which is equal to or greater than the predetermined value of the differential signal is detected, the binary signal edge pulse is output from the signal processing section as the reproduction edge pulse.

4. A reproduction apparatus for an optical disc, comprising an optical pickup including detectors formed by a plurality of light-detecting elements for scanning a pit sequence recorded on the optical disc and detecting an intensity of reflected light from the optical disc so as to generate detection signals, wherein reproduction data is generated based on the detection signals of the detectors, the detectors are grouped into a first light-detecting element group and a second light-detecting element group with respect to a scanning direction of the laser beam, and the reproduction apparatus includes:

an adder for performing an addition operation on a detection signal obtained by the first light-detecting element group and a detection signal obtained by the second light-detecting element group so as to generate a summation signal;

a differential amplifier for performing a difference operation on a detection signal obtained by the first light-detecting element group and a detection signal obtained by the second light-detecting element group so as to generate a differential signal; and a signal processing section for generating a reproduction edge pulse which corresponds to an edge of the pit based on the summation signal and the differential signal, and the signal processing section includes:

a binarization circuit for digitalizing the summation signal so as to generate a binary signal;

an edge detector for generating a binary signal edge pulse which corresponds to a rising edge or a falling edge of the binary signal;

an amplitude detection circuit for outputting a gate signal which is high only when an amplitude which is equal to or greater than a predetermined value of the differential signal is detected;

a logical operation circuit for outputting the binary signal edge pulse as the reproduction edge pulse only when the high gate signal is input thereto; and a reproduction data generation section for generating the reproduction data based on the reproduction edge pulse.

5. A reproduction apparatus for an optical disc according to claim 4, further comprising a switch for turning ON/OFF an electrical connection between the amplitude detection circuit and the logical operation circuit, wherein the reproduction apparatus is structured such that the switch is turned OFF when the optical disc is a disc for high recording density, and the switch is turned ON when the optical disc is a disc for low recording density.

6. A reproduction apparatus for an optical disc according to claim 4, further comprising a first equalizer for correcting a frequency characteristic of the summation signal and a second equalizer for correcting a frequency characteristic of the differential signal.

* * * * *